United States Patent [19]

Oesterlein et al.

[11] 4,067,864
[45] Jan. 10, 1978

[54] FIBER-REACTIVE 2-HYDROXY-PYRID-6-ON-(3)-YL AZO DYESTUFFS

[75] Inventors: Fritz Oesterlein, Basel; Gert Hegar, Schoenenbuch; Karl Seitz, Oberwil, all of Switzerland

[73] Assignee: Ciba-Geigy AG, Basel, Switzerland

[21] Appl. No.: 635,205

[22] Filed: Nov. 25, 1975

Related U.S. Application Data

[63] Continuation of Ser. No. 635,205, Nov. 25, 1975, abandoned, which is a continuation of Ser. No. 142,364, May 11, 1971, abandoned.

[30] Foreign Application Priority Data

May 15, 1970   Switzerland .................. 7316/70
July 30, 1970   Switzerland .................. 11494/70

[51] Int. Cl.² ............... C09B 62/08; C09B 62/24; C09B 62/44; D06P 1/38
[52] U.S. Cl. .............................. 260/153; 260/146 R; 260/146 D; 260/146 T; 260/154; 260/156; 260/196; 260/314.5; 260/242.2
[58] Field of Search .............. 260/153, 154, 156

[56] References Cited

U.S. PATENT DOCUMENTS

| 2,431,190 | 11/1947 | Morgan | 260/156 X |
|---|---|---|---|
| 2,860,129 | 11/1958 | Gunst | 260/153 |
| 2,891,941 | 6/1959 | Fasciati | 260/146 T |
| 2,931,794 | 4/1960 | Ruetimeyer et al. | 260/153 |
| 2,964,520 | 12/1960 | Baker et al. | 260/153 |
| 2,979,498 | 4/1961 | Andrew et al. | 260/153 |
| 3,151,105 | 4/1964 | Andrew et al. | 260/153 |
| 3,227,704 | 1/1966 | Schweizer et al. | 260/146 D |
| 3,527,746 | 9/1970 | Canonica et al. | 260/153 |
| 3,619,112 | 11/1971 | Berrie et al. | 260/156 X |
| 3,640,674 | 2/1972 | Berrie et al. | 260/156 |
| 3,657,214 | 4/1972 | Berrie et al. | 260/156 |
| 3,664,996 | 5/1972 | Berrie et al. | 260/153 |
| 3,725,383 | 4/1973 | Austin et al. | 260/146 T |
| 3,926,944 | 12/1975 | Berrie et al. | 260/153 |

Primary Examiner—Floyd D. Higel
Attorney, Agent, or Firm—Edward McC. Roberts; Prabodh I. Almaula; Michael W. Glynn

[57] ABSTRACT

Azo dyestuffs which contain an acid substituent which confers solubility in water of the formula

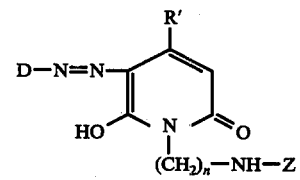

wherein D is the radical of a sulfo substituted benzene or naphthalene diazo component;

R' is alkyl of 1 to 4 carbon atoms;

Z is a fiber reactive group; and n is an integer of 1 to 4 are disclosed and are useful in dyeing nitrogen containing fibers such as polyamides, polyurethanes, silk, leather and wool as well as cellulose materials, in particular cotton.

3 Claims, No Drawings

FIBER-REACTIVE 2-HYDROXY-PYRID-6-ON-(3)-YL AZO DYESTUFFS

This is a continuation of application Ser. No. 635,205, filed Nov. 25, 1975, now abandoned, which in turn is a continuation of application Ser. No. 142,364, filed May 11, 1971, and now abandoned.

The present invention relates to azo compounds which contain a radical of the formula

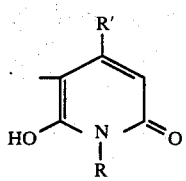

wherein R denotes an alkyl radical and R' denotes an alkyl or aryl radical. The radical of the formula (1) is joined to the radical of a diazo component via an azo bridge. The diazo radical is a heterocyclic or aromatic radical which can itself contain an azo group, or which is derived from a compound of the anthraquinone, nitroaryl, phthalocyanine or stilbene series, or the like. In particular, the diazo radical is a radical of the benzene or naphthalene series.

The azo compounds according to the invention can be free from groups which confer solubility in water, such as, for example sulphonic acid groups, carboxyl groups, or quaternised amino groups; in particular, however, they can also contain such groups. Above all, the compounds can contain one or more than one reactive radical, such as, for example, a halogenotriazine radical, in the molecule. In addition to being substituted by groups which confer solubility in water, the azo compounds can be substituted, as usual, by still further atoms or groups of atoms, and in particular both in the radical of the diazo component and in the radicals R and R', for example by halogen atoms and hydroxyl, amino, alkyl, aryl, alkoxy, aryloxy, acylamino, nitrile, acyl, carboalkoxy, acyloxy or nitro groups, and the like. If the radical of the diazo component contains, in the ortho-position to the azo bridge, a complex-forming group, such as, for example, a hydroxyl, amino or carboxyl group or an alkoxy group, such as, for example, a methoxy group, the compounds in question can optionally be converted to their heavy metal complex compounds either before the introduction of reactive radicals or afterwards.

Possible complex-forming metals are, for example, iron, manganese, nickel, copper, cobalt and chromium. The heavy metal complexes can contain one or two molecules of azo compounds containing the radical of the formula (1), joined to a metal atom (1:1- or 1:2-complexes). However, in 1:2-complexes one of the two ligand molecules can also be an azo compound which does not possess the radical of the formula (1) as coupling component, that is to say, for example, compound of the azo benzene type which contains appropriate complex-forming groups.

Groupings capable of reacting with the hydroxyl groups of cellulose or with the amino groups of polyamides, with the formation of a covalent chemical bond, are possible reactive radicals. Such a grouping is, in particular, a low molecular weight alkanoyl or alkylsulphonyl radical substituted by a removable atom or a removable group, a low molecular weight alkenoyl or alkenesulphonyl radical optionally substituted by a removable atom or a removable group, a carbocyclic or heterocyclic radical containing 4-, 5- or 6-rings which is substituted by a removable atom or a removable group and is bonded via a carbonyl or sulphonyl group, or a triazine or pyrimidine radical substituted by a removable atom or a removable group and directly bonded via a carbon atom, or such a grouping contains such a radical. A six-membered heterocyclic radical with two or three ring nitrogen atoms which contains halogen atoms and is bonded via a —NH— group, in particular a chloro-1,3,5-triazine radical, is preferred as the reactive radical.

A possible coupling component in the formula (2) is, in particular, the radical of a 1,4-dialkyl-6-hydroxypyrid-2-one.

The invention relates, in particular, to compounds of the formula

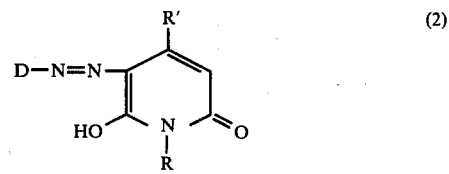

wherein R and R' are alkyl radicals with at most 4 carbon atoms and wherein D denotes the radical of a diazo component of the benzene series. The invention also relates, in particular, to compounds which possess reactive radicals, above all cyclic reactive radicals, such as, for example, triazine, pyrimidine or cyclobutane radicals, and groups which confer solubility in water; the reactive radicals can also be contained in the substituents R and R'.

A special group of compounds according to the invention are those of the formula

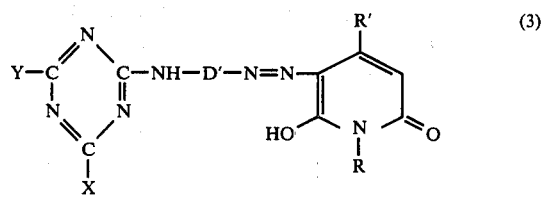

wherein D' is a sulphobenzene radical, X is a halogen atom and Y is a halogen or the radical of an amine, alcohol, phenol or mercaptan. The benzene radical can also carry further substituents in addition to one or two sulphonic acid groups as already mentioned.

Particularly valuable compounds are those of the formula (3), wherein D' is a monosulphobenzene radical, in particular such a radical which contains no further substituents other than a sulphonic acid group, X is a halogen atom, Y is the radical of an aminobenzene (or aminonaphthalene)-disulphonic acid, and R and R' are each a methyl or ethyl radical.

A further group of interesting compounds are those of the formula

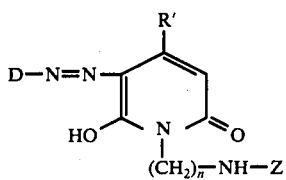
(4)

wherein D is the radical of a diazo component of the benzene or naphthalene series, in particular such a radical which contains substituents which confer solubility in water, R' is an alkyl or aryl radical, Z is a reactive radical, in particular a dihalogenotriazine radical or a monohalogenotriazine radical which contains the radical of ammonia, an amine, alcohol, phenol or mercaptan bonded to a carbon atom, and $n$ is a positive integer, preferably between 1 and 4. Valuable compounds of this type are those of the formula

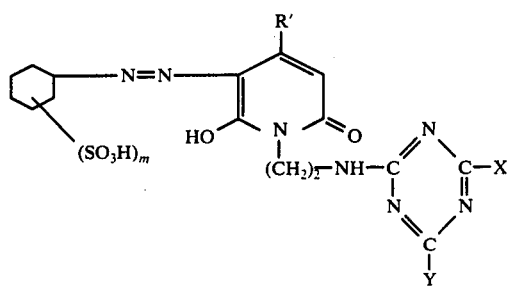
(5)

wherein X is a halogen atom, in particular a chlorine or bromine atom, Y is the radical of an aminobenzene (or aminonaphthalene)-sulphonic acid, R' is a low molecular weight alkyl radical, in particular a methyl radical, and $m$ is 1 or 2.

The manufacture of the azo compounds according to the invention can be carried out by coupling and, where appropriate, metallisation, or by acylation in order to introduce a reactive radical.

The manufacture by coupling is characterised in that a diazo component, in particular such a component of the benzene series, is coupled with a compound of the formula

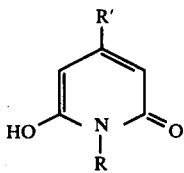
(6)

wherein R and R' having the meanings indicated in the explanation of the formula (1), or in particular represent alkyl radicals with 1 to 4 carbon atoms, and in that the resulting azo compound is optionally converted to a heavy metal complex by reaction with a heavy metal donor. The starting compounds are preferably diazo components which contain a reactive radical and a group which confers solubility in water. Possible coupling components of the formula (4) are, in particular, 1,4-dialkyl-6-hydroxypyrid-2-ones.

The diazotisation is carried out by methods which are in themselves known, for example by means of hydrochloric acid and sodium nitrite. The coupling with the pyridone is also carried out according to the methods which are in themselves known, in an acid to weakly alkaline medium.

The reaction with the heavy metal donor is carried out according to customary methods, in various solvents, such as, for example, water, ethanol, formamide, glycol-ethers pyridine and the like, depending on the solublity of the components, optionally at elevated temperature, and in a weakly acid to alkaline medium.

A diazo components which can be employed for the manufacture of the compounds according to the invention having the radical of the formula (1), or the corresponding heavy metal complexes, the diazo compounds of the following amines may be mentioned:
Aminobenzene,
1-Amino-4-chlorobenzene,
1-Amino-4-bromobenzene,
1-Amino-4-methylbenzene,
1-Amino-4-nitrobenzene,
1-Amino-4-cyanobenzene,
1-Amino-2,5-dicyanobenzene,
1-Amino-4-methylsulphonylbenzene,
1-Amino-4-carbalkoxybenzene,
1-Amino-2,4-dichlorobenzene,
1-Amino-2,4-dibromobenzene,
1-Amino-2-methyl-4-chlorobenzene,
1-Amino-2-trifluoromethyl-4-chlorobenzene,
1-Amino-2-cyano-4-chlorobenzene,
1-Amino-2-carbomethoxy-4-chlorobenzene,
1-Amino-2-carbomethoxy-4-nitrobenzene,
1-Amino-2-chloro-4-cyanobenzene,
1-Amino-2-chloro-4-nitrobenzene,
1-Amino-2-bromo-4-nitrobenzene,
1-Amino-2-chloro-4-carbethoxybenzene,
1-Amino-2-chloro-4-methylsulphonylbenzene,
1-Amino-2-methylsulphonyl-4-chlorobenzene,
1-Amino-2,4-dinitro-6-methylsulphonylbenzene,
1-Amino-2,4-dinitro-6-(2'-hydroxyethylsulphonyl)-benzene,
1-Amino-2,4-dinitro-6-(2'-chloroethylsulphonyl)-benzene,
1-Amino-2-methylsulphonyl-4-nitrobenzene,
1-Amino-4-methylsulphonyl-2-nitrobenzene,
1-Amino-2,4-dinitrobenzene,
1-Amino-2,4-dicyanobenzene,
1-Amino-2-cyano-4-methylsulphonylbenzene,
1-Amino-2,6-dichloro-4-cyanobenzene,
1-Amino-2,6-dichloro-4-nitrobenzene,
1-Amino-2,4-dicyano-6-chlorobenzene,
4-Aminobenzoic acid cyclohexyl ester,
1-Amino-2,4-dinitro-6-chlorobenzene and in particular 1-Amino-2-cyano-4-nitrobenzene,
1-Aminobenzene-2-, -3- or -4-sulphonamide, such as the N-methyl- or N,N-dimethyl- or -diethylamide,
2-Aminonaphthalene-6-sulphonic acid-N,γ-isopropoxypropylamide, 1-Aminobenzene-2-, -3- or -4-sulphonic acid-N,γ(sic-)isopropoxy-propylamide,
1-Aminobenzene-2-, -3- or -4-sulphonic acid-N-isopropylamide,
1-Aminobenzene-2-, -3- or -4-sulphonic acid-N,γ-methoxypropylamide,
1-Aminobenzene-2-, -3- or -4-sulphonic acid-N,N-bis-(β-hydroxyethyl)-amide,
1-Amino-4-chlorobenzene-2-sulphonamide, and the N-substituted derivatives,
4-Aminoazobenzene,
3,2'-dimethyl-4-aminoazobenzene,
2-Methyl-5-methoxy-4-aminoazobenzene,
4-Amino-2-nitroazobenzene,
2,5-Dimethoxy-4-aminoazobenzene,
4'-Methoxy-4-aminoazobenzene,
2-Methyl-4'-methoxy-4-aminoazobenzene,
3,6,4'-Trimethoxy-4-aminoazobenzene,
4'-Chloro-4-aminoazobenzene,
2'- or 3'-chloro-4-aminoazobenzene,
3-Nitro-4-amino-2',4'-dichloroazobenzene,
4-Aminoazobenzene-4'-sulphonamide,
1- or 2-Aminonaphthalene,
4-Methoxy-5-chloro-2-aminophenol,
6-Acetylamino-4-chloro-2-aminophenol,
6-Nitro-4-chloro-2-aminophenol,
6-Nitro-4-methyl-2-aminophenol,
3-Amino-4-hydroxy-acetophenone,
6-Nitro-4-acetylamino-2-aminophenol,
5-Nitro-3-amino-4-hydroxy-acetophenone,
2-Aminophenol-4-carboxylic acid amide,
4,6-Dichloro-2-aminophenol,
3,4,6-Trichloro-2-aminophenol,
4-Nitro-6-chloro-2-aminophenol,
6-Nitro- or 6-chloro-2-aminophenol-4-sulphonamide,
4-Nitro-2-aminophenol-5- or -6-sulphonamide,
2-Aminophenol-5-methylsulphone,
2-Aminophenol,
4- or 5-nitro-2-aminophenol,
4- or 5-chloro-2-aminophenol,
4,5-Dichloro-2-aminophenol,
4-Chloro-5-nitro-2-aminophenol,
2-Aminophenol-4- or -5-sulphonic acid,
3,4,6-Trichloroaminophenol,
4-Chloro-2-aminophenol-6-sulphonic acid,
6-Chloro-2-aminophenol-4-sulphonic acid,
4-Nitro-2-aminophenol-6-sulphonic acid,
6-Nitro-2-aminophenol-4-sulphonic acid,
2-Aminophenol-4,6-disulphonic acid,
4,6-Dinitro-2-aminophenol,
6-Acetylamino-2-aminophenol-4-sulphonic acid,
4-Acetylamino-2-aminophenyl-6-sulphonic acid,
4-Methyl-2-aminophenol,
4-Methoxy-2-aminophenol,
2-Aminophenol-4-sulphonamide,
2-Aminophenol-4-sulphone-N-β-hydroxyethylamide,
2-Aminophenol-4-sulphone-N-methylamide,
2-Aminophenol-5-sulphonamide,
4-Chloro-2-aminophenol-5- or -6-sulphonamide,
2-Aminophenol-4-sulphone-N,N-dimethylamide,
2-Aminophenol-4-methylsulphone,
2-Aminophenol-4-ethylsulphone,
6-Acetylamino-4-nitro-2-aminophenol,
2-Aminophenol-4,β-hydroxyethylsulphone,
Anthranilic acid,
2-Amino-3-naphthoic acid,
4- or 5-Chloroanthranilic acid,
4- or 5-Nitroanthranilic acid,
4- or 5-Acetylaminoanthranilic acid,
4- or 5-Sulphoanthranilic acid,
Anthranilic acid-4-sulphonamide,
Anthranilic acid-4- or -5,β-hydroxyethylsulphone,
Anthranilic acid-4- or -5-ethylsulphone,
4-Chloro-2-aminophenol-5-sulphonic acid-N-methylamide,
4- or 5-Benzoylaminoanthranilic acid,
2-Anisidine,
4- or 5-Chloro-2-anisidine,
4- or 5-Nitro-2-anisidine,
2-Anisidine-4- or -5-sulphonic acid,
2-Methoxy-5-methylaniline,
2,5-Dimethoxyaniline,
2-Anisidine-4- or -5-β-hydroxyethylsulphone,
2-Amino-1-naphthol-4,8-disulphonic acid,
1-Amino-2-naphthol-4-sulphonic acid,
1-Amino-2-naphthol-4-sulphonamide,
6-Nitro-1-amino-2-naphthol-4-sulphonic acid,
6-Acetylamino-1-amino-2-naphthol-4-sulphonic acid,
4-(2',5'-Disulphophenylazo)-2-methoxy-5-methylaniline,
4-(2',5'-Disulphophenylazo)-2,5-dimethoxyaniline,
4-(2',5'-Disulphophenylazo)-2-methoxy-1-naphthylamino-6-sulphonic acid,
4-(1',5'-Disulphonaphth-2'-ylazo)-2,5-dimethoxyaniline,
4-(2',3'- or 4'-Sulphophenylazo)-2-methoxyaniline,
Dianisidine,
Benzidine-3,3'-dicarboxylic acid,
4-(2'-, 3'- or 4'-Sulphophenylazo)-2-methoxy-5-methylaniline,
4-(2'-, 3'- or 4'-Sulphophenylazo)-2,5-dimethoxyaniline,
4-(2',5'- or 3',5'-Disulphophenylazo)-2-methoxyaniline,
4-(4',5'-Disulphophenylazo)-2-methoxy-5-methylaniline,
4-(3',5'-Disulphophenylazo)-2,5-dimethoxyaniline,
4-(2'-Carboxy-4'- or -5'-sulphophenylazo)-2-methoxyaniline,
4-(2'-Carboxy-4- or -5'-sulphophenylazo)-2,5-dimethoxyaniline,
4-(2'-Carboxy-4'- or -5'-sulphophenylazo)-2-methoxy-5-methylaniline,
4-(6', 8'-Disulphonaphth-2'-ylazo)-2-methoxyaniline,
4-(6',8'-Disulphonaphth-2'-ylazo)-2-methoxyaniline,
4-(6',8'-Disulphonaphth-2'-ylazo)-2-methoxy-5-methoxyaniline,
4-(6',8'-Disulphonaphth-2'-ylazo)-2,5-dimethoxyaniline,
4-Phenylazo-2-aminophenol.
Methanilic acid,
Sulphanilic acid,
Orthanilic acid,
1-Amino-4-methylbenzene-2-sulphonic acid,
Aniline-2,5-disulphonic acid,
2-Naphthylamine-1-sulphonic acid,
2-Naphthylamine-1,5-disulphonic acid,
2-Naphthylamine-4,8-disulphonic acid,
2-Naphthylamine-4,6,8- or 3,6,8-trisulphonic acid,
1-Amino-4-(β-sulphatoethyl-sulphonyl)-benzene,
1-Amino-3-(β-sulphatoethyl-sulphonyl)-benzene,
1-Amino-2-methoxy-4-(β-sulphatoethylsulphonyl)-5-methyl-benzene,
1-Amino-4-(β-sulphatoethylsulphonamido)-benzene,
1-Amino-4-(β-hydroxyethylsulphonyl)-benzene,
As coupling components there may be mentioned:
1-Ethyl-4-methyl-6-hydroxypyridone(2),
1-(β-Hydroxyethyl)-4-methyl-6-pyridone(2),
1-Methyl-4-phenyl-6-hydroxy-pyridone(2),
1-Butyl-4-methyl-6-hydroxy-pyridone(2), 1-Ethyl-4-hexyl-6-hydroxy-pyridone(2),
1-Issopropyl-4-methyl-6-hydroxy-pyridone(2),
1-Ethyl-4-phenyl-6-hydroxy-pyridone(2),
1,4-Dimethyl-6-hydroxy-pyridone(2),
1-($\beta$-Methoxyethyl)-4-methyl-6-hydroxy-pyridine(2),
1-Propyl-4-methyl-6-hydroxy-pyridone(2),
1-($\beta$-Aminoethyl)-4-methyl-6-hydroxypyridone(2).

Azo compounds with the radical of formula (1), or the corresponding heavy metal complexes, which conain one or more reactive groups can be manufactured by employing diazo or coupling components which already contain reactive groups. However, in many cases it is also possible to introduce reactive groups subsequently into the azo compound. The introduction can be effected by coupling or by metallisation. Those compounds with the radical of the formula (1), which contain a six-membered heterocyclic reactive radical bonded via an amino group, are of particular interest.

The introduction of the reactive radical is preferably effected by acylating appropriate aminoazo compounds or coupling components which contain an amino group which can be acylated, or appropriated diazo components, which in addition to the amino group to be diazotised, still contain a further amino group which can be acylated, or a group which can be converted to an amino group which can be acylated, for example by reduction or saponification, such as, for example, the nitro group or the acetylamino group.

Appropriate diazo components which, as described above, are suitable for introducing a reactive radical, are, for example:
1,3-Diaminobenzene-4-sulphonic acid,
1,3-Diaminobenzene-4,6-disulphonic acid,
1,4-Diaminobenzene-2-sulphonic acid,
1,4-Diaminobenzene-2,5- or 2,6-disulphonic acid,
1-Amino-4-nitrobenzene,
1-Amino-2-chloro-4-nitrobenzene,
1,3-Diamino-4-methylbenzene-6-sulphonic acid,
6-Acetylamino-4-chloro-2-aminophenol,
6-Nitro-4-methyl-2-aminophenol,
4-Nitro-2-aminophenol-6-sulphonic acid,
6-Acetylamino-1-amino-2-naphthol-4-sulphonic acid, among others, for example compounds already mentioned in the recitation of possible diazo components.

The coupling products, for example, of the above-mentioned diazo components with appropriate pyridones are possible aminoazo compounds which can be introduced into the reactive radicals after the coupling.

The halides or anhydrides of organic acids which contain easily replaceable atoms or groups of atoms are, in particular, possible acylating agents which, in addition to the acylating point, also contain a reactive radical.

As an acylating agent containing a reactive radical, the following may for example be mentioned:
Chloro- or bromoacetyl chloride,
$\beta$-Chloro- or $\beta$-bromopropionyl chloride,
$\alpha,\beta$-Dichloro- or $\alpha,\beta$-dibromopropionyl chloride,
Chloromaleic acid anhyride,
Carbylsulphate,
Acrylyl chloride,
$\beta$-Chloro- or $\beta$-bromoacrylyl chloride,
$\alpha$-Chloro- or $\alpha$-bromoacrylyl chloride,
$\alpha,\beta$-Dichloro- or -dibromoacrylyl chloride,
Trichloroacrylyl chloride,
Chlorocrotonyl chloride,
Propiolic acid chloride,
3,5-Dinitro-4-chlorobenzene-sulphonic acid or -carboxylic acid chloride,
3-Nitro-4-chlorobenzene-sulphonic acid or -carboxylic acid chloride,
2,2,3,3-Tetrafluorocyclobutane-1-carboxylic acid chloride,
2,2,3,3-Tetrafluorocyclobutyl-acrylic acid chloride,
$\beta$-Chloroethylsulphonyl-endomethylene-cyclohexanecarboxylic acid chloride,
Acrylsulphonyl-endomethylene-cyclohexanecarboxylic acid chloride,
and, above all, heterocyclic acid halides and their derivatives, such as the
2-Chlorobenzoxazole carboxylic acid chlorides,
2-Chlorobenzthiazole carboxylic acid chlorides or -sulphonic acid chlorides, and, above all, the following compounds possessing at least 2 nitrogen atoms as heteroatoms of a 6-membered heterocyclic ring:
4,5-Dichloro-1-phenylpyridazonecarboxylic acid chloride or -sulphonic acid chloride,
4,5-Dichloropyridazonepropionic acid chloride,
1,4-Dichlorophthalazinecarboxylic acid chloride or -sulphonic acid chloride,
2,3-Dichloroquinoxalinecarboxylic acid chloride or -sulphonic acid chloride,
2,4-Dichloroquinazolinecarboxylic acid chloride or -sulphonic acid chloride,
2-Methanesulphonyl-4-chloro-6-methylpyrimidine,
Tetrachloropyridazine,
2,4-Bis-methanesulphonyl-6-methylpyrimidine,
2,4,6-Tri- or 2,4,5,6-tetrachloropyrimidine,
2,4,6-Tri- or 2,4,5,6-tetrabromopyrimidine,
2-Methanesulphonyl-4,5-dichloro-6-methylpyrimidine,
2,4-Dichloropyrimidine-5-sulphonic acid,
5-Nitro- or 5-cyano-2,4,6-trichloropyrimidine,
2,6-Bis-methanesulphonylpyridine-4-carboxylic acid chloride,
2,4-Dichloro-5-chloromethyl-6-methyl-pyrimidine,
2,4-Dibromo-5-bromomethyl-6-methyl-pyrimidine,
2,4-Dichloro-5-chloromethylpyrimidine,
2,4-Dibromo-5-bromomethylpyrimidine,
2,5,6-Trichloro-4-methylpyrimidine,
2,6-Dichloro-4-trichloromethylpyrimidine or, in particular
2,4-Bismethylsulphonyl-5-chloro-6-methylpyrimidine,
2,4,6-Trimethylsulphonyl-1,3,5-triazine,
2,4-Dichloropyrimidine,
3,6-Dichloropyridazine,
3,6-Dichloropyridazine-5-carboxylic acid chloride,
2,6-Dichloro- or 2,6-dibromo-4-carboethoxypyrimidine,
2,4,5-Trichloropyrimidine,
2,4-Dichloropyrimidine-6-carboxylic acid chloride,
2,4-Dichloropyrimidine-5-carboxylic acid chloride,
2,6-Dichloro- or 2,6-dibromopyrimidine-4- or -5-carboxylic acid or -sulphonic acid amides or
-4- or -5-sulphonic acid chloride,
2,4,5,6-Tetrachloropyridazine,
5-Bromo-2,4,6-trichloropyrimidine,
5-Acetyl-2,4,6-trichloropyrimidine,
5-Nitro-6-methyl-2,4-dichloropyrimidine,
2-Chlorobenzthiazole-6-carboxcylic acid chloride,
2-Chlorobenzthiazole-6-sulphonic acid chloride,
5-Nitro-6-methyl-2,4-dichloropyrimidine,
2,4,6-Trichloro-5-bromopyrimidine,
2,4,5,6-tetrafluoropyrimidine,
4,6-Difluoro-5-chloropyrimidine, 2,4,6-Trifluoro-5-chloropyrimidine, 2,4,5-Trifluoropyrimidine,
2,4,6-Trichloro- (-tribromo- or -trifluoro)-1,3,5-triazines, and 4,6-dichloro (diboromo- or -difluoro)-1,3,5-triazines
which are substituted in the 2-position by an aryl or alkyl radical, for example a phenyl, methyl or ethyl radical, or by the radical of an aliphatic or aromatic mercapto compound bonded via the sulphur atom, or by the radical of an aliphatic or aromatic hydroxy compound bonded via the oxygen atom, or, in particular, by an NH$_2$ group or by the radical of an aliphatic, heterocyclic or aromatic amino compound bonded via the nitrogen atom. As such compounds, the radicals of which can be bonded in the 2-position to the triazine nucleus by reaction with trihalogenotriazines, the following may for example be mentioned: aliphatic or aromatic mercapto or hydroxy compounds, such as thioalcohols, thioglycollic acid, thiophenols, alkoxyalkanols, methyl alcohol, ethyl alcohol or isopropyl alcohol, glycollic acid, phenol, chlorophenols or nitrophenols, phenolcarboxylic and phenolsulphonic acids, naphtholsulphonic acids and the like, but in particular ammonia and compounds containing amino groups which can be acylated, such as hydroxylamine, hydrazine, phenylhydrazine, phenylhydrazinesulphonic acids, glycol monoalkyl ethers, methylamine, ethylamine, isopropylamine, methoxyethylamine, methoxypropylamine, dimethylamine, diethylamine, methylphenylamine, ethylenephenylamine, chloroethylamine, ethanolamines, propanolamines, benzylamine, cyclohexylamine, morpholine, piperidine, piperazine, aminocarbonic acid esters, aminoacetic acid ethyl ester, aminoethane-sulphonic acid. N-methylaminoethanesulphonic acid, but, above all, aromatic amines, such as aniline, N-methylaniline, toluidines, xylidines, chloroanilines, p- or m-aminoacetanilide, aminophenols, anisidine, phenetidine and, in particular, anilines containing acid groups, sulphanilic acid, methanilic acid, orthanilic acid, anilinedisulphonic acid, aminobenzylsulphonic acid, aniline-Ω-methanesulphonic acid, aminobenzenedicarboxylic acids, naphthylaminomonosulphonic, -disulphonic and -trisulphonic acids, aminobenzoic acids, such as 2-hydroxy-5-aminobenzoic acid, and in addition also coloured compounds, or compounds with dyestuff character, for example 4-nitro-4'-aminostilbenedisulphonic acid, 2-nitro-4'-aminodiphenylamino-4,3'-stilbene-disulphonic acid, 2-nitro-4'-aminodiphenylamine-4,3'-disulphonic acid and, in particular, aminoazo dyestuffs or aminoanthraquinones or phthalocyanines which still contain at least one reactive amino group.

The introduction of the substituent in the 2-position of the triazine radical can also be effected after the condensation with the starting diamine or after the reaction, according to the invention, to give the azo compound with the radical of the formula (1).

In addition to the fibre-reactive radicals which can be introduced by acylation, further such radicals which may be mentioned are, for example, the vinylsulphone, the β-sulphato- or -thiosulphatoethylsulphone, β-thiosulphatopropionylamide, the β-thiosulphatoethylsulphonylamide or the sulphonic acid-N,β-sulphatoethylamide groups, which are introduced into the diazo component in another way, for example by ester formation or thioester formation.

As compounds which contain a fibre-reactive radical which cannot be introduced by acylation, and in which the fibre-reactive radical is thus preferably not bonded via an amino group, but is bonded directly to the benzene radical, the sulpho esters of the following sulphones may, in particular, be mentioned:
1-Amino-2-methoxy-5-(β-hydroxyethyl)-phenylsulphone,
1-Aminobenzene-3- or -4-β-hydroxyethylsulphone,
1-Amino-2-methyl-benzene-5-β-hydroxyethylsulphone,
1-Amino-4-(β-hydroxyethylsulphonylpropionylaminomethyl)-benzene
1-Amino-4-(β-hydroxyethylsulphonylamino)-benzene,
as well as reactive compounds which can be obtained via the appropriate methylols by Einhorn's method, such as, for example, 1-amino-4-chloroacetylaminomethyl-benzene or 1-amino-3-chloroacetylaminomethyl-benzene-6-sulphonic acid.

The condensation with the acid halides or anhydrides, or with the heterocyclic halogen compounds, is advantageously carried out in the presence of acid-binding agents, such as, for example, sodium carbonate. Of course, all these reactions are to be carried out in such a manner that an unsaturated bond or a replaceable halogen atom still remains in the end product.

The azo compounds obtainable according to the present process and its different variants, as well as their heavy metal complexes, are new; they are suitable for dyeing and printing widely different types of materials, such as, for example, silk, leather, wool, synthetic fibres of polyamides and polyurethanes, polyester fibres or polyacrylonitrile fibres, and polyhydroxylic materials, such as, for example, cellulose-containing materials of fibrous structure, such as linen, cellulose, regenerated cellulose, cotton and the like.

The non-metallised azo compounds according to the invention are particularly important as dyestuffs.

The water-insoluble compounds are suitable as dispersion dyestuffs for dyeing semi-synthetic or fully synthetic fibres, in particular for dyeing polyester material.

The compounds which are soluble in acetone and contain sulphonamide groups can be employed for dyeing cellulose esters in th spinning composition.

The water-soluble basic compounds, that is to say compounds containing a quaternised amino group or an amino group which can be quaternised, are suitable for dyeing polyacrylonitrile or polyester fibres from aqueous solution.

However, the most important compounds are those azo compounds according to the invention which contain a reactive radical and a group which confers solubility in water, in particular a sulphonic acid group. These dyestuffs are preferably employed for dyeing nitrogen-containing fibres, such as, for example, of polyamides, polyurethanes, silk, leather and in particular wool, for example from weakly acid, neutral or weakly alkaline baths, optionally with the addition of customary auxiliaries, for example ethylene oxide condensation products of high molecular weight amines, and, above all, for dyeing cellulose materials, in particular cotton, for example by the exhaustion process from a dilute liquor, from alkaline baths optionally having a high salt content, and in particular by the pad-dyeing process, according to which the article is impregnated with aqueous dyestuff solutions which optionally also contain salt, and the dyestuffs are fixed after an alkali treatment or in the presence of alkali, optionally under the action of heat.

The water-soluble reactive dyestuffs according to the invention show an excellent build-up capacity. They are also suitable for printing, in particular on cotton, and also for printing nitrogen-containing fibres, for example of wool, silk or mixed fabrics containing wool.

The dyeings and printings are distinguished by interesting and valuable greenish-tinged yellow, very pure and brilliant shades. The dyeings and printings exhibit a good stability to acids and alkalis, and a good stability to synthetic resin finishing agents, have a good fastness to light and, in particular on cotton, an outstanding fastness to wet treatments. The high degree of fixation and the easy removability of non-fixed dyestuff is also worth mentioning.

In order to improve the fastness to wet treatments, it is advisable to rinse the dyeings and printings obtained thoroughly with cold and hot water, optionally with the addition of an agent which has a dispersing effect and promotes the diffusion of the non-fixed material.

In the examples which follow, the parts, unless otherwise indicated, denote parts by weight, and the percentages denote percentages by weight. The relationship of parts by weight to parts by volume is the same as of the gram to the cm$^3$.

EXAMPLE 1.

A solution of 18.5 parts of cyanuric chloride in 50 parts of acetone is added to a neutral solution of 26.8 parts of 1,3-diaminobenzene-4,6-disulphonic acid in 500 parts of water at 0° to 5° C, and the $p_H$-value is kept at between 6 and 7 during the condensation by adding, dropwise, 2 N sodium hydroxide solution. When condensation is complete, the resulting monocondensation product is diazotised at 0° to 5° C in the customary manner. A neutral solution of 15.3 parts of 1-ethyl-6-hydroxy-4-methylpyridone(2) is then added to the solution of the diazonium salt. The coupling mixture is adjusted, over the course of about 1 hour, to a $p_H$ of 7 by adding 2 N sodium hydroxide solution. The solution of the dichlorotriazine dyestuff is then treated with a neutral solution of 17.3 parts of 1-aminobenzene-3-sulphonic acid and warmed to 40° to 45° C, the $p_H$ being kept at between 6 and 7 by adding 2 N sodium hydroxide solution dropwise. The dyestuff formed is isolated by sprinkling sodium chloride into the mixture, and is filtered off and dried. The product dyes cotton in vey pure, strongly greenish-tinged yellow shades identical dyestuff is also obtained if the primary monocondensation product of 1,3-diaminobenzene-4,6-disulphonic acid and cyanuric chloride is firstly condensed with 1-aminobenzene-3-sulphonic acid, and subsequently coupled to 1-ethyl-6-hydroxy-4-methyl-pyridone(2).

The manufacture of the coupling component 1-ethyl-6-hydroxy-4-methyl-pyridone-(2) is carried out by boiling 1-ethyl-6-hydroxy-4-methyl-pyridone-(2)-3-carbonamide for several hours with approximately 20% strength sodium hydroxide solution, and subsequently acidifying with hydrochloric acid, whereupon the decarboxylated product of melting point 134°–136° C precipitates in a crystalline form.

1-Ethyl-6-hydroxy-4-methylpyridone(2) is obtained by heating 1-ethyl-3-cyano-4-methyl-6-hydroxypyridone(2) in aqueous 75% strength sulphuric acid solution at 130° C until the evolution of carbon dioxide is complete.

If the amines indicated in the second column in the following table are employed instead of 1-aminobenzene-3-sulphonic acid, and the pyridones specified in the third column in the table are employed instead of 1-ethyl-6-hydroxy-4-methyl-pyridone-(2), further yellow dyestuffs having good fastness properties are obtained.

| | Amines | Pyridones |
| --- | --- | --- |
| 1 | 3-Aminobenzoic acid | 1-Methyl-4-phenyl-6-hydroxy-pyridone-2 |
| 2 | 4-Aminobenzoic acid | 1-Isopropyl-4-methyl-6-hydroxy-pyridone-2 |
| 3 | 1-Aminobenzene-3-metnanesulphonic acid | 1-(β-Acetylaminoethyl)-4-methyl-6-hydroxypyridone-2 |
| 4 | 2-Amino-5-sulpho-benzoic acid | 1-Benzyl-4-methyl-6-hydroxy-pyridone-2 |
| 5 | N-Methylaniline-4-sulphonic acid | 1,4-Diethyl-6-hydroxypyridone-2 |
| 6 | Aniline-2,4-disulphonic acid | 1-Butyl-4-ethyl-6-hydroxy-pyridone-2 |
| 7 | Anthranilic acid ω-methanesulphonic acid | 1-Ethyl-4-methyl-6-hydroxy-pyridone-2 |
| 8 | Aminomethanesulphonic acid | 1-(β-Phenoxyethyl)-4-methyl-6-hydroxypyridone-2 |
| 9 | Aniline | 1-Methyl-4-butyl-6-hydroxy-pyridone-2 |
| 10 | Dimethylamine | 1-Cyclohexyl-4-methyl-6-hydroxypyridone-2 |
| 11 | Diethanolamine | 1-Ethyl-4-methyl-6-hydroxy-pyridone-2 |
| 12 | Methylamine | 1-Methyl-4-(4'-methoxyphenyl)6-hydroxypyridone-2 |
| 13 | Methyltaurine | 1,4-Dimethyl-6-hydroxy-pyridone-2 |
| 14 | Morpholine | 1-Ethyl-4-methyl-6-hydroxy-pyridone-2 |
| 15 | Ammonia | 1-Ethyl-4-methyl-6-hydroxy-pyridone-2 |
| 16 | 1-Aminobenzene-2-sulphonic acid | 1-(γ-Hydroxypropyl)-4-benzyl-6-hydroxypyridone-2 |
| 17 | 2-Aminotoluene-4-sulphonic acid | 1,4-Diisopropyl-6-hydroxy-pyridone-2 |
| 18 | 1-Naphthylamine-5-sulphonic acid | 1-(β-Chloroethyl)-4-ethyl-6-hydroxypyridone-2 |
| 19 | 1-Naphthylamine-4,6-disulphonic acid | 1 1-(2',3'-Dihydroxypropyl)-4-methyl-6-hydroxypyridone-2 |
| 20 | 1-Naphthylamine-3,5,7-trisulphonic acid | 1,4-Diethyl-6-hydroxy-pyridone-2 |

EXAMPLE 2

47.4 parts of the aminoazo dyestuff of the formula

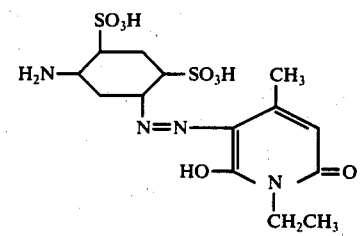

(manufactured by coupling 31 parts of 1-amino-3-acetylaminobenzene-4,6-disulphonic acid with 15.3 parts of 1-ethyl-6-hydroxy-4-methyl-pyridone-(2) and subsequently saponifying the acetylamino group with 2 N hydrochloric acid), are dissolved neutral in 500 parts of water, and a solution of 18.5 parts of cyanuric chloride in 50 parts of acetone is added. The $p_H$-value during the condensation is kept between 6 and 7 by adding 2 N sodium hydroxide solution dropwise. When condensation is complete the dichlorotriazine dyestuff is salted out, filtered off and mixed with a concentrated solution of 5 parts of disodium phosphate and 5 parts of monosodium phosphate, and dried in vacuo at 40 to 50° C.

The dyestuff thus obtained dyes cotton in very pure, strongly greenish-tinged yellow shades.

Similar yellow dyestuffs are obtained if, instead of cyanuric chloride, equivalent amounts of α,β-dibromopropionyl chloride, chloroacetyl chloride, α-bromoacrylyl chloride, 4,5-dichloropyridazonepropionyl chloride, 2,3-dichloroquinoxalinecarboxylic acid chloride, 2,4,5,6-tetrachloropyrimidine, 2,4,6-trifluoro-5-chloropyrimidine, 2,4-bismethylsulphonyl-5-chloro-6-methylpyrimidine, 2,4-dichloropyrimidine-5-carboxylic acid chloride, 3,6-dichloropyridazine-5-carboxylic acid chloride, 2,4-dichloro-6-methyl-1,3,5-triazine, 2,4-dichloro-6-phenoxy-1,3,5-triazine, 2-amino-4,6-dichlorotriazine, cyanuric bromide or 2-methoxy-4,6-dichloro-1,3,5-triazine, are employed.

EXAMPLE 3

23 parts of 2-isopropoxy-4,6-dichloro-1,3,5-triazine are added to a neutral solution of 26.8 parts of 1,3-diaminobenzene-4,6-disulphonic acid in 500 parts of water, and the reaction mixture is warmed to 40° to 45° C, The $p_H$-value is kept at between 6 and 7 during the condensation by adding 1 N sodium hydroxide solution dropwise. When condensation is complete, the compound thus obtained is diazotised in the customary manner by adding 25 parts of 4 N sodium nitrite solution and 25 parts of 30% strength hydrochloric acid. The pure yellow suspension of the diazonium salt is then treated with a neutral solution of 15.3 parts of 1-ethyl-6-hydroxy-4-methyl-pyridone-(2). The coupling mixture is neutralised by adding 2 N sodium hydroxide solution dropwise. The dyestuff formed is then salted out with potassium chloride, filtered off and dried. The product dyes cotton in very pure, strongly greenish-tinged yellow shades.

If the appropriate amount of 1-methyl-6-hydroxy-4-methylpyridone(2) is used as the coupling component, a dyestuff having very similar properties is obtained.

EXAMPLE 4

The procedure of Example 2 is followed, but a solution of 53 parts of the disodium salt of 1-amino-4-(4'-aminophenylamino)-anthraquinone-2,3'-disulphonic acid in 600 parts of water is added when the condensation is complete, and the temperature is raised to 40°-50° C and a $p_H$-value of 6-7 is maintained up to the end of the condensation, by adding sodium hydroxide solution dropwise. The dyestuff formed is precipitated by adding sodium chloride. It dyes cotton in fast, green shades.

If a phthalocyanine dyestuff of the formula

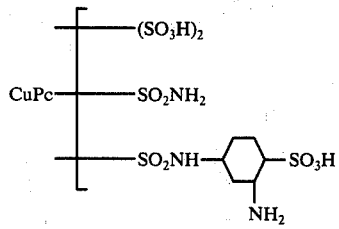

(CuPc = radical of copper phthalocyanine) is used instead of the aminoanthraquinone mentioned, a green dyestuff is also obtained.

EXAMPLE 5

11 parts of 2-amino-5-sulphobenzoic acid are diazotised in the customary manner. The resulting diazo solution is run into a solution of 7.6 parts of 1-ethyl-4-methyl-6-hydroxypyridone-2 in 500 parts of water at 0° C and 5 parts of 30% strength sodium hydroxide solution, whereupon an intensely yellow dyestuff is immediately formed, which is precipitated completely by adding sodium chloride. It dyes wool from an acid bath in pure greenish-tinged yellow shades. A brownish-tinged yellow colouration is obtained by subsequent chromation.

If the diazo components specified in column II in the following table are employed instead of 2-amino-5-sulphobenzoic acid, and the pyridones mentioned in column III are employed instead of 1-ethyl-4-methyl-6-hydroxy-pyridone-2 as coupling components, further dyestuffs are obtained which produce dyeings of the shades specified in column IV.

| | | Coupling Component | | |
|---|---|---|---|---|
| No. | Diazo Component | R | R' | Shade of Polyamide Fibre Material |
| 1 | 2-Aminobenzene-sulphonic acid | Methyl | Methyl | greenish tinged yellow |
| 2 | Naphthylamine-1-sulphonic acid | β-Hydroxy-ethyl | n-Hexyl | yellow |
| 3 | 4-Aminobenzene-sulphonic acid | Isopropyl | Methyl | greenish tinged yellow |
| 4 | 4-(6',8'-Disulpho-naphth-2'-ylazo)-3-methylaniline | Benzyl | Methyl | orange |
| 5 | 6-Acetylamino-2-aminophenol-4-sulphonic acid | Ethyl | Isopropyl | yellow-brown (Cu-complex) |
| 6 | 2-Aminophenol-4,6-disulphonic acid | Butyl | Methyl | yellow-brown (Co-complex) |
| 7 | 4,4'-Diaminodiphenyl-urea-3,3'-disulphonic acid | Ethyl | Methyl | reddish-tinged yellow |
| 8 | 4,4'-Diaminostilbene-2,2'-disulphonic acid | n-Propyl | Phenyl | yellow |
| 9 | 2-Aminobenzene-sulphonic acid | Chloro-acetyl-amino-ethyl | Methyl | yellow |

EXAMPLE 6

A solution of 25.3 parts of aniline-2,5-disulphonic acid neutralised with sodium carbonate is added to a suspension of 19 parts of cyanuric chloride in 200 parts of ice water. The mixture is kept weakly acid to Congo Red by means of dilute sodium hydroxide solution, and is stirred at a temperature of 8° C until the compounds have completely dissolved. A neutral solution of 18.8 parts of 1,3-diaminobenzene-4-sulphonic acid is then added. The mixture is warmed to 30° C and is slowly neutralised with a solution of sodium hydroxide. When condensation is complete, diazotisation is effected in the customary manner with hydrochloric acid and sodium nitrite. A weakly alkaline solution of 15.3 parts of 1-ethyl-6-hydroxy-4-methylpyridone-(2) is added to the diazo compound, and the coupling mixture is kept weakly acid to neutral by adding 2 N sodium hydroxide solution. The dyestuff is precipitated by adding sodium chloride, and is filtered off and dried. It dyes cellulose fibres in very pure, strongly greenish-tinged yellow shades.

If the same amount of aniline-2,4-disulphonic acid or appropriate amounts of sulphanilic acid, metanilic acid or anthranilic acid, or mixtures thereof, are employed instead of aniline-2,5-disulphonic acid, yellow dyestuffs are obtained which have similar properties to the abovementioned dyestuff.

If 1-ethyl-6-hydroxy-4-methyl-pyridone-(2) is replaced by 1,4-dimethyl-6-hydroxy-pyridone-(2), a greenish-tinged yellow dyestuff having good fastness properties is obtained.

further yellow dyestuffs are obtained according to Example 6, from the components mentioned in the following table.

| | I<br>Acylating Agent | II<br>Diazo Component | III<br>Coupling Component |
|---|---|---|---|
| 9 | 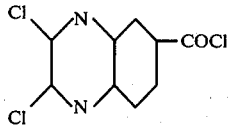 | " | " |

EXAMPLE 7

A weakly alkaline solution of 16.8 parts of 1-($\beta$-aminoethyl)-6-hydroxy-4-methyl-pyridone-(2) (obtained by dissolving in water, with the addition of sodium hydroxide solution) is added to the diazo compound obtained from 25.3 parts of aniline-2,5-disulphonic acid, and the coupling mixture is made neutral with sodium carbonate. When coupling is complete, a solution of 32.2 parts of 2-phenylamino-4,6-dichlorotriazine-3'-sulphonic acid is added and condensation is carried out for 2 hours at 30 to 40° C, the $p_H$-value being kept between 6 and 7 by adding 2 N sodium hyroxide solution dropwise. The dyestuff formed is then salted out, filtered off and dried. It dyes cotton in fast greenish-tinged yellow shades.

The pyridone employed as coupling component is obtained by heating 1-($\beta$-aminoethyl)-3-cyano-4-methyl-6-hydroxy-pyridone-(2) in aqueous 75% strength sulphuric acid until the evolution of $CO_2$ is complete.

Similar yellow dyestuffs are obtained if equivalent amounts of the following diazo components are employed instead of aniline-2,5-disulphonic acid:

| | Diazo Component | Colour Shade on Cotton |
|---|---|---|
| 1 | 6-Chloro-2-aminophenol-4-sulphonic acid | reddish-tinged yellow |
| 2 | 5-Sulphoanthranilic acid | yellow |
| 3 | 4-(6',8'-Disulphonaphth-2'-ylazo)-2,5-dimethoxyaniline | orange |
| 4 | 2-Naphthylamine-1,5-disulphonic acid | yellow |
| 5 | 2-Naphthylamine-3,6,8-trisulphonic acid | yellow |
| 6 | 1-Amino-4-($\beta$-sulphatoethyl-sulphonyl)-benzene | yellow |
| 7 | 1-Amino-4-($\beta$-sulphatoethylsulphonamide)-benzene | yellow |
| 8 | 1-Amino-4-($\beta$-hydroxyethyl-sulphonyl)-benzene | yellow |

EXAMPLE 8

58 parts of the dichlorotriazine dyestuff obtained according to the details of Example 2 are dissolved in 1000 parts of water at a $p_H$ of 7. A solution of 5.4 parts of 1,4-phenylenediamine is added and condensation is carried out at 40°-50° C, a $p_H$-value of 6-7 being maintained by adding 2 N sodium hydroxide solution. When condensation is complete the bireactive dyestuff, in which the two reactive groups are linked by a phenylenediamine bridge, is precipitated by adding sodium chloride. It dyes cotton or regenerated cellulose fibres in pure, strongly greenish-tinged yellow shades.

If an equivalent amount of 1,3-phenylenediamine, 1,4-phenylenediamine-2-sulphonic acid, 4,4'-diaminostilbene-2,2'-disulphonic acid, 4,4'-diaminodiphenyl-2,2'-disulphonic acid or 4,4'-diaminodiphenylurea-3,3'-disulphonic acid is employed instead of 1,4-phenylenediamine, as the bridging component, dyestuffs having similar properties are obtained.

EXAMPLE 9

17.3 parts of 1-aminobenzene-3-sulphonic acid are dissolved in water, the solution being made neutral by adding sodium hydroxide solution, and are condensed with 18.5 parts of cyanuric chloride in the customary manner at 0°-5° C. When condensation is complete, an aqueous solution of 21 parts of the sodium salt of 1,3-phenylenediamine-4-sulphonic acid is added and condensation is carried out at 25°-30° C. Thereafter the mixture is cooled to 0° C, 18.5 parts of cyanuric chloride are added, and condensation is carried out at a $p_H$ of 4-6 by adding 2 N sodium hydroxide solution dropwise. A further 21 parts of the sodium salt of 1,3-phenylenediamine-4-sulphonic acid are now added, the temperature is raised to 30° C and condensation is carried out at a $p_H$ of 6-7. The resulting solution is cooled to 0° C by adding ice, is acidified with 25 parts by volume of 30% strength hydrochloric acid, and is diazotised by adding 4 N sodium nitrite solution dropwise, until a permanent blue colouration is obtained on potassium iodide starch paper.

A solution of 14 parts of 1-ethyl-4-methyl-6-hydroxy-pyridone-2 in 50 parts of water, and 9.5 parts of 30% strength sodium hydroxide solution, are added to the yellow diazo solution. When coupling is complete, the mixture is neutralised to a $p_H$ of 7 by adding sodium bicarbonate, and the dyestuff is precipitated by sprinkling in potassium chloride. It dyes cotton in fast greenish-tinged yellow shades.

EXAMPLE 10

12.6 parts of 6-acetylamino-2-aminophenol-4-sulphonic acid are suspended at 0° C in a mixture of 100 parts of water and 15 parts of 30% strength hydrochloric acid, and diazotised by adding 25 parts of 2 N sodium nitrite solution dropwise. The resulting diazo suspension is added to a solution of 7.7 parts of 1-ethyl-4-methyl-6-hydroxypyridone-2 in 50 parts of water, 50 parts of ice and 5.5 parts of 30% strength sodium hydroxide solution, and the $p_H$ is slowly adjusted to 7 by adding sodium hydroxide solution dropwise. When coupling is complete, 30 parts of 36% strength hydrochloric acid are added and the mixture is boiled under reflux for 1 hour to saponify the acetyl group. The dyestuff which crystallises out on cooling is filtered off, is dissolved in 250 parts of water at a $p_H$ of 7, and is treated with a solution of 13 parts of cobalt acetate tetrahydrate. The mixture is boiled under reflux for 20 minutes, is then allowed to cool, and the cobalt complex is precipitated by adding sodium chloride. It is dissolved in 500 parts of water at 35°-40° C and is treated with an aqueous solution of 16.1 parts of 2-phenylamino-4,6-dichlorotriazine-3'-sulphonic acid. Condensation is carried out at 35°-40° C, a pH-value of 6-7 being maintained by adding 2 N sodium hydroxide solution dropwise.

When condensation is complete, the dyestuff is precipitated by adding potassium chloride. It dyes cellulose fibre material in red-orange, fast shades.

If an equivalent amount of chromium acetate is employed instead of cobalt acetate, a dyestuff is obtained which dyes cellulose fibres in fast, red-brown shades.

DYEING INTRUCTION I 2 parts of the dyestuff of Example 1, 1st. paragraph, are dissolved in 100 parts of water.

A cotton fabric is impregnated on a padder with this solution, and the excess liquid is squeezed out so that the material retains 75% of its weight of dyestuff solution.

The article thus impregnated is dried, then impregnated at room temperature in a solution which contains, per liter, 10 g of sodium hydroxide and 300 g of sodium chloride, squeezed out to 75% liquid uptake, and steamed at 100° to 101° C for 60 seconds. The article is then rinsed, soaped at the boil for quarter of a hour in a 0.3% strength solution of an ion-free detergent, rinsed and dried.

A fixed dyeing which is fast to boiling is obtained. If a cellulose fabric is used instead of a cotton fabric, a similarly good result is obtained.

PRINTING INSTRUCTION 2 parts of the dyestuff obtained according to Example 2 are mixed with 20 parts of urea, dissolved in 28 parts of water, and stirred into 40 parts of a 5% strength sodium alginate thickener. 10 parts of a 10% strength sodium carbonate solution are then added.

A cotton fabric is printed on a roller printing machine using this printing ink, is dried, and the print obtained is steamed at 105° C for 8 minutes. The printed fabric is then thoroughly rinsed in cold and hot water and dried.

DYEING INSTRUCTION II 1 part of the dyestuff according to Example 5 of the table of page and 3 parts of 80% strength acetic acid are dissolved in 4000 parts of water. 100 parts of polyamide fabric are introduced into this bath at 40° C, the temperature is raised to 96°–98° C over the course of 30 minutes, and the fabric is dyed for 60 minutes at the temperature indicated. The dyeing is subsequently well rinsed. A strong, greenish-tinged yellow dyeing is obtained.

We claim:

1. An azo dyestuff of the formula

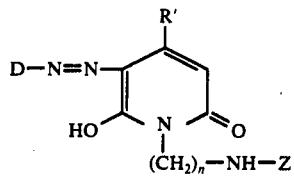

wherein
D is the radical of a sulfo substituted benzene or napthalene diazo component;
R' is alkyl of 1 to 4 carbon atoms;
Z is a fiber reactive radical capable of reacting with the hydroxyl groups of cellulose or with the amino groups of polyamides; and
n is an integer of 1 to 4.

2. An azo dyestuff according to claim 1 of the formula

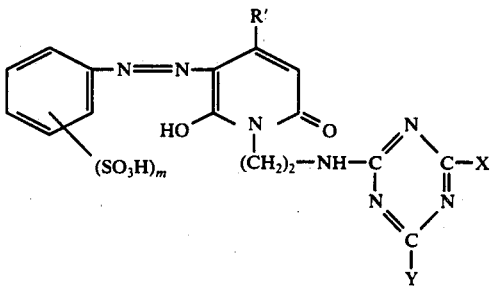

wherein
X is chloro or bromo;
R' is alkyl of 1 to 4 carbon atoms;
m is 1 or 2; and
Y is sulfophenylamino or sulfonapthylamino.

3. An azo dyestuff according to claim 2 wherein R' is methyl.

* * * * *

UNITED STATES PATENT AND TRADEMARK OFFICE
CERTIFICATE OF CORRECTION

PATENT NO. : 4,067,864
DATED : January 10, 1978
INVENTOR(S) : Fritz Oesterlein, Gert Hegar & Karl Seitz It is certified that error appears in the above–identified patent and that said Letters Patent are hereby corrected as shown below:

Cover page, under Related U.S. Application Date, delete "Continuation of Serial No. 635,205, filed November 25, 1975", and in its stead insert -- Continuation of Serial No. 462,165, filed April 18, 1974 --.

Signed and Sealed this

Third Day of July 1979

[SEAL]

Attest:

Attesting Officer

LUTRELLE F. PARKER
Acting Commissioner of Patents and Trademarks